Dec. 5, 1967  H. H. WOODSON  3,356,872
MAGNETOHYDRODYNAMIC A-C POWER GENERATOR
Filed April 28, 1964  4 Sheets-Sheet 1
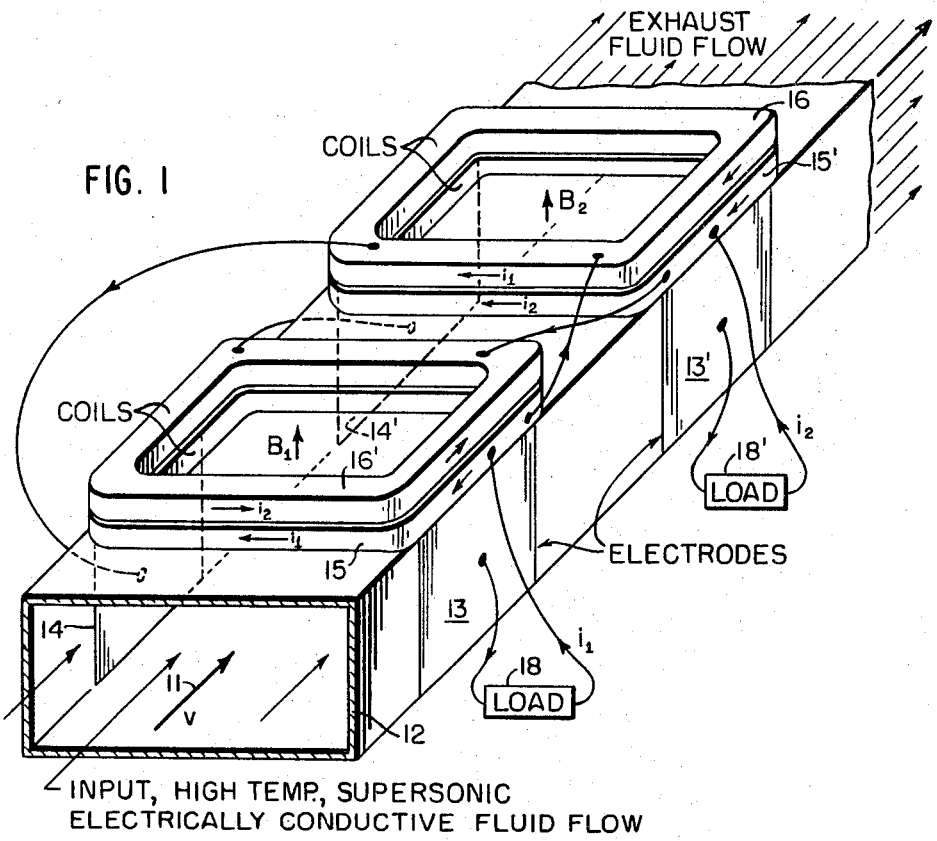
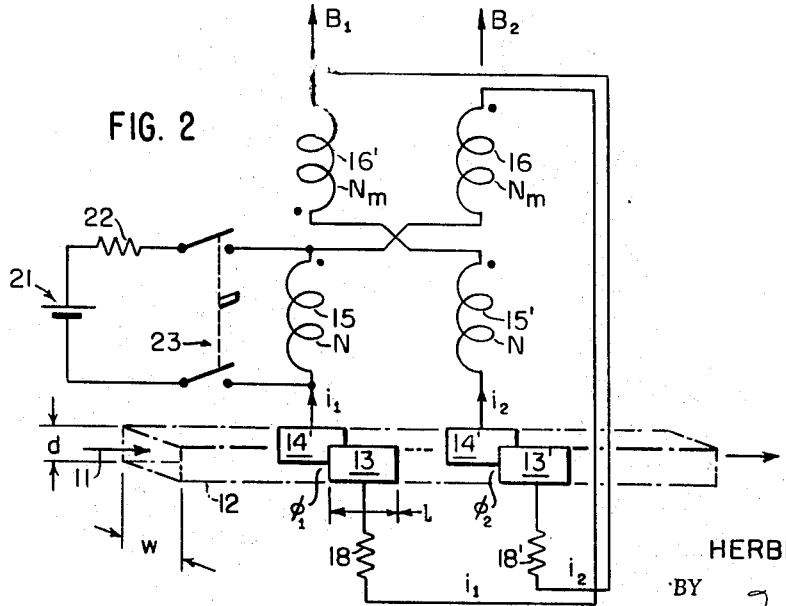
INVENTOR.
HERBERT H. WOODSON Dec. 5, 1967          H. H. WOODSON          3,356,872

MAGNETOHYDRODYNAMIC A-C POWER GENERATOR

Filed April 28, 1964                                  4 Sheets-Sheet 2

INVENTOR.
HERBERT H. WOODSON

BY

ATTY

Dec. 5, 1967   H. H. WOODSON   3,356,872
MAGNETOHYDRODYNAMIC A-C POWER GENERATOR
Filed April 28, 1964   4 Sheets-Sheet 3

INVENTOR.
HERBERT H. WOODSON
BY
ATTY

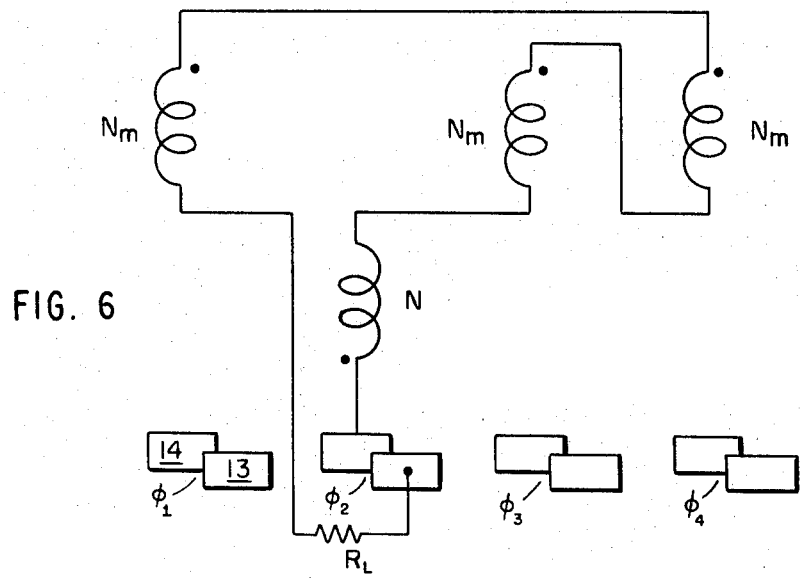
FIG. 6
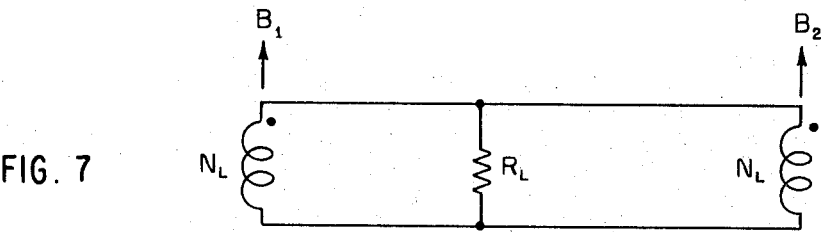
FIG. 7
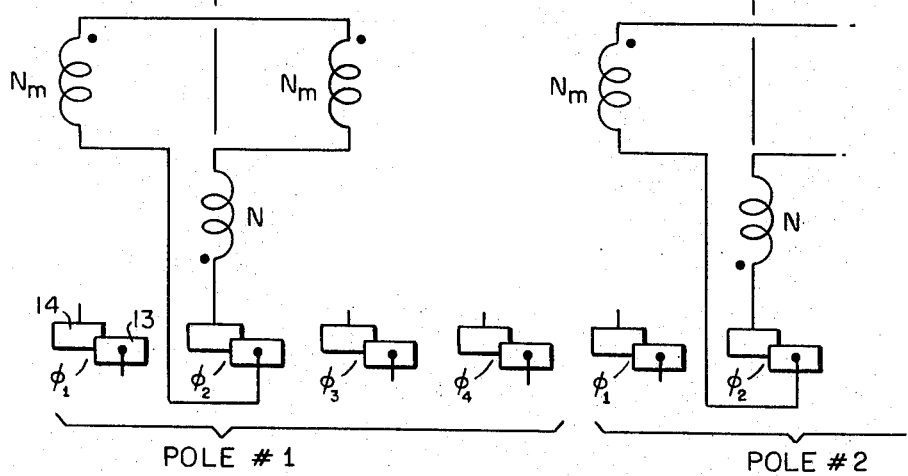
POLE #1        POLE #2
INVENTOR.
HERBERT H. WOODSON United States Patent Office 3,356,872
Patented Dec. 5, 1967

3,356,872
MAGNETOHYDRODYNAMIC A-C POWER
GENERATOR
Herbert H. Woodson, Watertown, Mass., assignor to
Massachusetts Institute of Technology, Cambridge,
Mass., a corporation of Massachusetts
Filed Apr. 28, 1964, Ser. No. 363,080
13 Claims. (Cl. 310—11)

This invention relates to a magnetohydrodynamic electric power generator and in particular to an alternating current generator employing magnetic field coupling to supply the reactive power of the generator.

Magnetohydrodynamic (MHD) power generation is attractive because of the inherent simplicity of the system and because higher overall thermal efficiency can be obtained. In many instances, it is desirable to obtain A-C power, especially in cases where the power is to be transmitted over great distances and distributed as in central-station power generation for public and commercial use.

MHD power generation systems being developed can be classified into two types: conduction generators and induction generators. Conduction generators have electrodes in contact with the flowing, conducting fluid to carry the generated current. Conduction generators can theoretically generate A-C or D-C power. Induction generators couple inductively to currents in the flowing, conducting fluid. There are many forms of induction generators but they all have one feature in common: they generate A-C power.

MHD power generators of both the conduction and induction types are considered for use both with hot, ionized gases, and with liquid metals. Systems using these working fluids exhibit the same fundamental MHD interactions but there are three essential differences in the two systems: (1) Gases must be considered as compressible but liquid metals can be assumed incompressible; (2) Gases at temperatures which allow containment by material walls have much lower electrical conductivity than liquid metals; (3) Gas flow velocities can be much greater than liquid metal flow velocities.

Attempts so far to devise methods for generating A-C power directly from an ionized gas flow using either a conduction or an induction machine have been shown to be impractical because of the requirement of a large capacitive reactive power supply. In essence this results because with the extremely low electrical conductivity, a large magnetic field is required to generate high enough voltages to obtain usable amounts of power. The necessity to alternate the magnetic field for A-C power generation means that the field energy must be removed periodically from the generator. The best possible method so far for doing this is with capacitive energy storage. However, the resulting reactive power flow in the excitation system is much larger (ten to one hundred times larger) than the real power flow. Thus, if a machine is to generate net usable power the losses in the excitation system must be quite low. It is possible with superconducting or cryogenic coils to obtain magnetic field coils with sufficiently low losses for direct A-C power generation; however, at the present time, it appears impractical to obtain low loss capacitive systems for this application. Low-loss dielectric materials exist but are prohibitively expensive in the quantities needed. Moreover, the usable energy densities are so low that a capacitive system would have to be many times larger in volume than the generator for which it supplies reactive power. Thus, with ionized gases, the use of capacitors has been shown to be impractical with the result that, to generate A-C power, one first generates D-C power in a conduction machine and then converts to A-C by electronic means with ignitron inverters or by using rotary converters. The D-C to A-C conversion schemes are expensive, but are still within the realm of economic possibility.

The same problems exist, but to a lesser degree with generators using a liquid metal as the working fluid. Liquid-metal generators, both conduction and induction, can be made practical for A-C power generation using capacitive reactive power supplies. However, the capacitors are still relatively expensive and they are relatively large because of their low allowable energy density.

Because all of these systems are MHD devices, they will use magnetic fields generated by current flowing in coils. The state of the art in magnet coils is such that high fields, 20 to 50 kilogauss, are obtainable which means high energy densities. Moreover, magnet coils for energy storage in sizes typical of large-scale power-generation systems (10 megawatts and up) are relatively inexpensive.

It is, therefore, an object of this invention to provide an MHD generator which will provide A-C electrical power output without requiring a capacitor reactive-power supply. It is a feature of this invention to provide an MHD generator which uses only magnetic fields to supply the reactive power.

The A-C power generator of the invention generates A-C power in a conduction type MHD machine, using only the magnetic fields of coils as external energy storage elements to supply reactive power. Such a generator requires only slightly larger magnet coils than a D-C generator; consequently, it should be less expensive to build than either the D-C generator with inverters or the A-C generator (conduction or induction) with capacitors to supply reactive power. The generator of this invention is most attractive for use with ionized gases.

Other objects and features of the invention will be pointed out in the following description and claims and illustrated in the accompanying drawings, which disclose, by way of example, the principle of the invention and the best mode, which has been contemplated, of applying that principle.

In the drawings:

FIGURE 1 is a perspective representation of a two-phase generator according to this invention.

FIGURE 2 is a schematic representation of the generator of FIGURE 1.

FIGURE 6 is a schematic showing one phase of a four-phase generator.

FIGURE 7 is a schematic showing one phase of a two pole generator.

Figure 3:
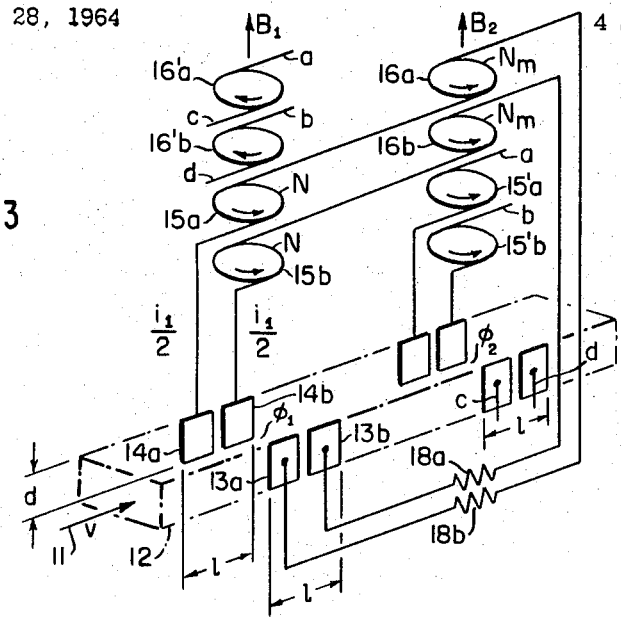
FIGURE 3 is a schematic representation of the two-phase generator having segmented electrodes.

An MHD generator incorporating the principle of the present invention is shown diagrammatically in FIGURE 1. An electrically conductive fluid 11, either a gas or a liquid, is caused to flow as a stream with velocity $v$ through a channel or duct 12. A magnetic field $B_1$ produced by electrically energized coils 15 and 16' is transverse to the direction of fluid flow. Spaced electrodes 13, 14 are contained in opposite walls of the duct and positioned opposite one another as a pair on an axis transverse to the fluid flow and flux $B_1$. These electrodes are serially connected through a load 18 of resistance $R_L$ to a self-exciting coil 15 and a cross-coupling coil 16 which have $N$ and $N_m$ turns respectively. Longitudinally disposed along channel 12 is another similar circuit whose components are identified by primed numbers. These circuits are cross-coupled in a manner such that the flow of conductive fluid 11 will cause in the steady state an alternating current $i_1$ and $i_2$ to be generated in the two circuits. These currents are caused to flow through the coils 15, 15', 16 and 16' in the directions indicated in FIGURE 1. It is noted that the magnetomotiveforce (MMF) direction of coil 16' is reversed relative the coils 15, 15' and 16 to provide an unsymmetric cross-coupled circuit which converts the individual D.C. generators of FIGURE 1 into a two-phase alternating current generator. Any one of the coils could have had its MMF in opposition to the other three coils with the same result. The flux densities $B_1$ and $B_2$ are produced by currents $i_1$ and $i_2$ flowing through these coils in the directions shown in FIGURE 1. Coils 15, 15' and 16 and 16' shown, for purposes of illustrating the invention more clearly as being above channel 12, would in practice be close to the channel and each other and have half their turns below the channel, with the turns of any one coil connected in series aiding. The coils are considered to provide a uniform flux density in the inter-electrode space although in practice this is not necessary.

Although only two pairs of electrodes 13–14 and 13'–14' and their coils are shown in FIGURE 1, the generator can have a large number of pairs as will be illustrated later. Furthermore, the pairs can be connected for two-phase operation as in FIGURE 1 or for operation with any number of phases. In the latter case, the number of coils associated with each pair of electrodes must be increased but the essentials of operation are the same as for the two-phase configuration to be described.

FIGURE 2 is a schematic representation of the two-phase generator of FIGURE 1 which shows more clearly the electrical wiring and magnetic polarity of the coils. The coils are shown widely spaced from channel 12 and from each other for clarity of presentation. Also shown in FIGURE 2 is auxiliary starting circuitry which will be discussed later. Inspection of the circuit of FIGURE 2 shows that each phase current $i_1$, $i_2$ is in a circuit having a self-inductance and a mutual inductance, where the polarity of the mutual inductance is reversed for one of the phase current circuits.

The coupled circuits of FIGURES 1 and 2 may be analyzed to determine the method of operation of the generator and the magnitudes of the parameters of the generator.

For a magnetic flux density $B_1$ and $B_2$ between electrode pairs 13–14 and 13'–14', respectively, which is fairly uniform over the length $l$ of the electrodes and the width $w$ of the channel 12 whose dimension in the magnetic field direction is $d$, where $\mu_o$ is the magnetic permeability of the fluid, the equations for the flux densities of the circuits of FIGURE 1 are:

$$B_1 = \frac{N\mu_o}{d} i_1 - \frac{N_m\mu_o}{d} i_2 \quad (1)$$

$$B_2 = \frac{N\mu_o}{d} i_2 + \frac{N_m\mu_o}{d} i_1 \quad (2)$$

If the internal resistance between one pair of electrodes 13–14 is defined as $R_i = w/ld\sigma$, where $\sigma$ is the electrical conductivity of the fluid, if $R_c$ represents the resistance of the magnet coils 15 and 16 (15' and 16') in series, and if $R_L$ represents the load resistance 18, 18', the equations for the two circuits of FIGURE 1 may be written as $$\frac{vw\mu_o N}{d} i_1 - \frac{vw\mu_o N_m}{d} i_2 = (R_L + R_i + R_c) i_1 +$$
$$\frac{\mu_o lw}{d} (N^2 + N_m^2) \frac{di_1}{dt} \quad (3)$$

$$\frac{vw\mu_o N}{d} i_2 + \frac{vw\mu_o N_m}{d} i_1 = (R_L + R_i + R_c) i_2 +$$
$$\frac{\mu_o lw}{d} (N^2 + N_m^2) \frac{di_2}{dt} \quad (4)$$

The solutions of Equations 3 and 4 will give, as a steady state condition, values of $i_1$ and $i_2$ which are constant amplitude sinusoids if certain terms are cancelled. Thus, if $$\frac{vw\mu_o N}{d} = R_L + R_i + R_c \quad (5)$$

the solution of Equations 3 and 4 in the steady state is $$i_1 = I \cos \omega t \text{ and } i_2 = I \sin \omega t \quad (6)$$

where $$\omega = \frac{A}{B}, \text{ and } B = \frac{\mu_o lw}{d}(N^2 + N_m^2); A = \frac{vw\mu_o}{d} N_m$$

Thus the generator of FIGURE 1 will operate in the A-C steady state at the frequency $\omega$ while providing two-phase currents $i_1$, $i_2$ of finite amplitude to external loads 18, 18'.

It will be recognized by those skilled in the art that absent the cross or mutual coupling windings $N_m$, the generator of FIGURE 1 would merely be two isolated circuits each capable of providing D.C. current if the condition of Equation 5 is satisfied. The addition of the coupling windings $N_m$ have transformed this pair of self-excited D-C generator into a two-phase, self-excited A-C generator. The price for making the change to A-C operation is the addition of the $N_m$-turn coils which occupy space and contribute to resistance $R_c$. Reactive power is provided completely by the two magnetic storages having flux densities $B_1$ and $B_2$. Note from Equation 6 that the two currents $i_1$, $i_2$ have 90 degrees phase differences. Substituting Equation 6 in Equations 1 and 2 shows that $B_1$ and $B_2$ also have 90 degrees phase difference. Thus, the total magnetic energy is constant and oscillates between the two magnetic-field storages.

It can be shown quite easily with Equations 3 and 4 that if $$\frac{vw\mu_o N}{d} > R_L + R_i + R_c$$

the machine is overexcited and the A-C output will build up with an exponential envelope until something in the system saturates. On the other hand, when $$\frac{vw\mu_o N}{d} < R_L + R_i + R_c$$

the machine is underexcited and any A-C output will decay to zero with an exponential envelope.

Assuming steady-state A-C operation, the equation for frequency $\omega$ may be written as $$\omega = \frac{vN_m}{l(N^2 + N_m^2)} \quad (7)$$

Generally, operation at the highest frequency is desirable. With fixed velocity $v$ and electrode length $l$, $\omega$ has its maximum value when $N = N_m$ for which the equation for $\omega$ becomes $$\omega_{max.} = v/2lN \quad (8)$$

Also, assuming that $R_L + R_c$ is some multiple $\alpha$ of $R_i$, $$R_L + R_c = \alpha R_i$$

Then, using the definition of $R_i$ and the condition for self-excitation (Equation 5) one obtains for the number of turns $N(=N_m)$ $$N = \frac{1+\alpha}{\mu_o \sigma lv} \quad (9)$$

Note that the denominator of this expression is a magnetic Reynolds number based on the length of a pair of electrodes.

Substitution of Equation 9 into Equation 8 yields $$\omega_m = \frac{\mu_o \sigma v^2}{2(1+\alpha)} \quad (10)$$

This result shows that the maximum frequency of operation depends on the conductivity $\sigma$, velocity $v$, and degree of loading $\alpha$ and is independent of the size of the device.

For conditions that must be satisfied with an ionized gas for A-C generation of this type, one can use Equation 10 to calculate values. For values of gas conductivity and velocity of 100 mhos/meter and the supersonic velocity of 1500 meters/second, a frequency of 6 c.p.s. can be obtained when the generator is loaded for maximum power output ($\alpha=1$). The preceding values of conductivity and velocity represent the typically attainable values using combustion gases with seeding by alkaline metal vapors. Theoretical estimates of seeded noble gases operated in the nonequilibrium mode will provide conductivities of 500 mhos/meter with the same or higher velocity thus generating frequencies of at least 60 c.p.s.

Using values of conductivity of only 50 mhos/meter and velocity of 1500 meters/sec., the number of turns $$N(=N_m)$$

may be obtained from Equation 8 for $l=1$ meter and $\alpha=1$, to give $N=5$ turns. This number of turns for such a machine is reasonable.

Although the apparatus of this invention is particularly useful for conducting gases, operation with meals in the liquid state is also possible.

For the values of velocity and conductivity of combustion gases reasonably obtainable, the number of turns per field coil is relatively small. For a large generator the field conductors may be so large in cross-sectional area that eddy currents become a problem. Moreover, if the gas has tensor conductivity, the solid electrodes will short out the Hall electric fields and degrade performance.

Both of these deleterious effects can be reduced by using segmented electrodes. The construction for only two electrode segments 13a, 13b and 14a, 14b per phase is illustrated in FIGURE 3 for a portion of the two-phase single pole MHD generator of FIGURE 2. The essence of the connections of the sequential electrodes is that each electrode pair 13a–14a, is connected to a circuit exactly like that for the unsegmented electrode pair 13–14 of FIGURE 2. The circuit for each electrode pair 13a–14a, 13b–14b of FIGURE 3 is electrically insulated from the circuits of the other electrode pairs. The coils 15a and 16a are serially connected to segmented electrodes 13a and 14a to provide a complete circuit having phase $\phi_1$. Another complete circuit having phase $\phi_1$ is the serial connection of coils 15b, 16b and electrodes 13b and 14b. Phase $\phi_2$ is similarly connected. The arrows associated with the coils indicate the direction of current flow in the coils and is, therefore, of their individual MMF's. The flux $B_1$ is the result of summing the MMF of coils 15a, 15b, 16'a, and 16'b. Similarly, flux $B_2$ is the result of the MMF of coils 15'a, 15'b, 16a and 16b.

If many electrode segments are used, the power may be extracted from the generator by inductive coupling (illustrated in FIGURE 5) to the magnetic fields $B_1$ and $B_2$ of each phase or by transformer coupling to a common load by isolating primary windings connected in place of loads 18 to each segmented electrode pair of a given phase. Because of the availability of either technique of power extraction to a common load for each phase, the problem of many electrically isolated loads, which cannot be avoided with segmented electrodes in direct-current MHD generators, is not a problem for the segmented-electrode A-C MHD generator of this invention.

Electrically, the operation of each segmented electrode pair is identical to that given earlier for the unsegmented electrode generator of FIGURE 1. Referring to the original analysis, the equation for the number of turns N connected to the unsegmented electrodes is determined to be $$N=\frac{1+\alpha}{\mu_0 \alpha l v}$$

It is seen that the length $l$ of the electrode determines the number of turns, other conditions being unchanged. This equation is directly applicable to the segmented electrode situation of FIGURE 3 where $l$ is the total length of the segmented electrodes constituting one phase of the generator. Thus segmenting the electrodes requires an increase in the number of windings to equal the number of segmented electrode pairs, with each winding having the same number of turns as required by a machine with unsegmented electrodes. However, each winding carries a fraction $l/n$, for $n$ segments per phase, of the total output current provided by that phase of the generator; consequently, the volume of field conductor is essentially independent of the number of electrode segments.

Figure 4:
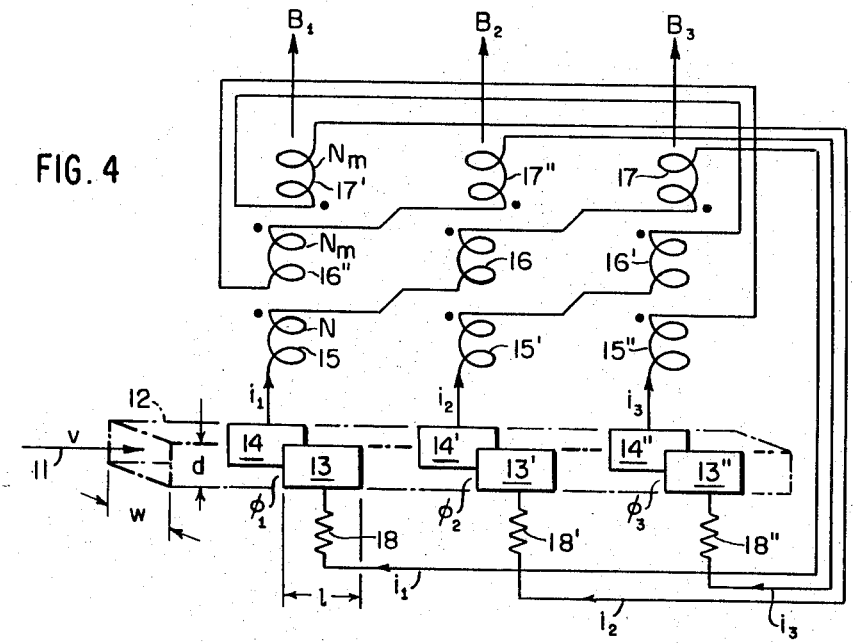
FIGURE 4 is a schematic representation of a three-phase generator according to this invention.

A three-phase embodiment of an MHD generator according to this invention is shown in FIGURE 4. The three-phase generator is seen to be an extension of the two-phase generator of FIGURE 2. Each phase $\Phi_1$, $\Phi_2$ and $\Phi_3$ has one N turn coil 15 and two $N_m$ turn coils 16, 17. For the assumed current directions of $i_1$, $i_2$ and $i_3$ in the N turn coils, a selected one of these currents in one $N_m$ turn coil of each phase must provide an opposing magnetomotive force as shown in FIGURE 4. If it is assumed that $i_1$, $i_2$ and $i_3$ form a three-phase balanced system of equal amplitude currents, 120° apart in time phase, the sum of the MMF's of the $N_m$ turn coils, for instance 16″ and 17′, produces an effective MMF $\sqrt{3/2}$ as large as the MMF from the N turn coil 15 and 90° out of phase with the MMF of the N turn coil. The analysis of the two-phase generator is then available for evaluation of the three-phase case. It follows that the maximum output frequency, other factors being constant, occurs when $N_m=\sqrt{2/3}N$ instead of $N_m=N$ as in the two-phase case because of the larger effective MMF of the two $N_m$ turn coils associated with each phase. The flux densities $B_1$, $B_2$ and $B_3$ form a balanced three-phase system with each flux density, for example $B_1$, being the result of the magnetomotive force of coils 15, 16″, and 17′. The flux $B_1$ is caused to flow through the channel 12 between electrodes 13, 14 as for the circuit of FIGURE 2. It should be noted that the 90° phase relationship between the $N_m$ coils' MMF and the N coil MMF is a consequence of the opposing MMF in one $N_m$ coil 17 and the phase relationship of the current $i_1$, $i_2$ and $i_3$ producing the MMF's.

Since an n-phase system can be reduced to a two-phase system by the same process of vector addition of currents or MMF's as illustrated for the three-phase system, the extension of the analysis of the two-phase system to these n-phase systems is apparent. Also, following the principles of construction of the two- and three-phase systems illustrated by FIGURES 2 and 4, a generator of any number of phases may be constructed, although the three-phase generator would appear most useful for commercial generation of power.

It is also apparent that a multi-pole machine of any number of phases can be constructed by simply repeating in the gas flow direction along the channel the structural principles of FIGURES 1 through 4, and electrically connecting the output of the poles of a given phase either in parallel or series. Since the conductivity of the gas and its velocity may vary along the channel path, changes in dimensions of the coils N and $N_m$ to produce greater flux, longer length of electrodes, and expansion of the cross sectional area of the channel are available to the designer to provide uniform output from each of the poles. Additionally, each pole-phase output may have its output matched to the other pole-phase outputs by adjusting the load coupling of coil 19 to each pole as in FIGURE 5.

Figure 5:
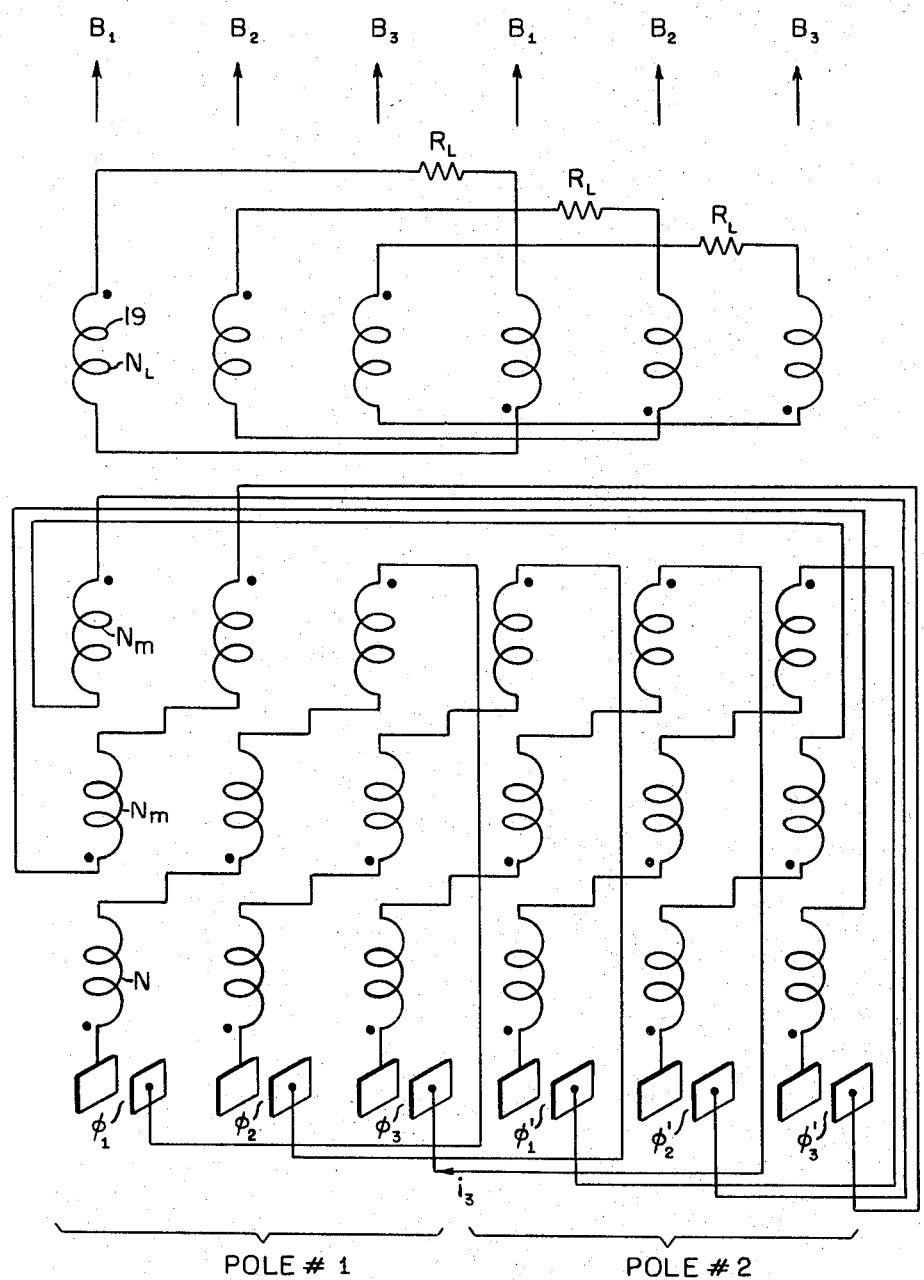
FIGURE 5 is a schematic representation of a two-pole, three-phase generator.

A schematic representation of a three-phase two-pole MHD generator is shown in FIGURE 5. Phases $\phi_1$, $\phi_2$, and $\phi_3$ of pole #1 represent a balanced three-phase system, with $\phi'_1$, $\phi'_2$, and $\phi'_3$ of pole #2 representing the same phases as their unprimed counterparts. Poles #1 and #2 are electrically connected by causing each phase current such as $i_3$ of phase $\phi_3$ to be magnetically coupled to the next two succeeding phases $\phi'_1$ and $\phi'_2$. By continuing this "feed-forward" for each phase current, the corresponding phases of each pole are phase locked. Alternately, each pole could have been constructed as in FIGURE 4 to form two electrically isolated three-phase circuits. Connecting each phase to a common load through coils 19 of $N_L$ turns in FIGURE 5 will provide the necessary phase-locking to cause the poles to be synchronized. The coils $N_L$ of FIGURE 5 are shown connected in series aiding and each phase is electrically isolated from the other phases. As in conventional A.C. circuits, the loads $R_L$ may be connected in a Y or $\Delta$ connection to form a three-phase system. It is also possible to connect the coils $N_L$ of any one phase in parallel, or series-parallel if desired, as for conventional generators. The number of turns of coils $N_L$ and their coupling to flux densities $B_{1'} \ldots B_3$ may be adjusted individually to cause each phase $\phi_1' \ldots \phi'_3$ output to be balanced with respect to the other phases and thus to provide an equal share of output current to the loads $R_L$.

Extension of the mode of operation of the invention to more than three phases may be accomplished in several ways. One technique is to couple each phase to every other phase. FIGURE 6 shows how one phase, $\phi_2$, of a four phase system is coupled to the other three phases. The polarity and turns of coils $N_m$ for maximum frequency are determined by requiring that the reactive flux component be equal to the real flux component in each phase as previously stated for the two- and three-phase cases. In the case of the four-phase system of FIGURE 6, if $N=N_m$ and with the coil polarities shown, the preceding condition will be satisfied if each phase is connected in the same manner as phase $\phi_2$.

Another way for interconnecting the phases of a multi-phase generator including three phase is shown in FIGURE 7. Each phase is coupled only to the phase preceding and succeeding it. In FIGURE 7, only phase $\phi_2$ is shown in order to more clearly demonstrate the cross coupling to the other phases $\phi_1$ and $\phi_3$. Two poles #1 and #2 are shown in order to illustrate how a common load $R_L$ may be connected to two or more poles of any phase by paralleling coils $N_L$ which are magnetically coupled to corresponding phases of different poles. The turns of coils $N_m$ relative to turns of coil $N$ for maximum frequency is dependent on the angle between the phases and may be determined as done earlier for the three phase system.

The velocity and conductivity requirements for combustion gases require that the gas be at a temperature significantly higher than that obtained in conventional furnaces. Techniques are known to those skilled in the art for raising the temperature to the vicinity of 3000° C. where seeding with cesium and other alkaline metal vapors produces sufficiently high conductivity to be useful in this invention. Non-equilibrium techniques promise even higher conductivities with corresponding improvement in the maximum frequency attainable by the apparatus of the invention. Water-cooled-nozzle techniques are capable of providing the required high-velocity gas. Since techniques for producing these gases are well known and not directly part of the inventive concept, they will not be further discussed.

The high temperatures, up to 3000° C., of the conductive gases used in MHD generators present a materials problem for the channel 12 and electrodes 13, 14. The channel 12 must be an electrical insulator and long lived. Satisfactory operation at this temperature has been obtained with a high temperature ceramic embedded with spaced water-cooled copper studs. The studs reduce the temperature of the ceramic to a region where the electrical resistivity of the ceramic is sufficiently high to cause it to behave as a good insulator for the electrodes 13, 14 which are at a high voltage. Although channel 12 has been shown as a rectangular dust of uniform area, it is apparent that other cross-sections and flaring in the direction of gas flow are available.

The electrodes 13, 14 must be good electrical conductors and electron emitters while at the same time resistant to destruction or consumption in the high-temperature chemically-active atmosphere in which it functions. The most practical electrode material at this time appears to be the carbon electrode. Since the carbon electrode is consumed, replenishing the carbon electrode without interrupting operation is necessary, and various techniques have been devised by those skilled in the art to accomplish this result.

A given flux density requirement of the MHD generator is more easily achieved the bigger the generator since the coil geometry is such that the surface area of the coil increases at a faster rate than the volume of the coil conductor thus facilitating cooling. For generators in the 100 megawatt size, power dissipation in the field coils of 10% of the output capability is reasonable and may be obtained by using water cooled copper coils 15, 16. For smaller generators the percentage power dissipation increases until at around 20 mw., 50% of the output power is being dissipated in the copper coils. Increased efficiency at all power levels is possible by the use of either superconducting or cryogenic coils. The decreased power loss in the cooled coils makes economically feasible the cost of providing a cooling medium such as liquid helium. The material for the cryogenic coil typically may be super-purified aluminum or sodium. Super-purified copper is thought not to be useful since its magnetoresistance is too high for this application.

Since combustion gas is a compressible medium, the changing force on the gas because of the nonuniform magnetic field will cause localized variations in the velocity of the gas dependent upon the position along the length of the channel. Thus the velocity used in the previous design equations is the average flow velocity $v$, of the gas. It is well known that the compressibility of the combustion gas will result in a reactive component in the output current and also a third harmonic current. Neither of these effects are serious problems since the reactive component may be accommodated by modifying the number of turns of the $N_m$ coils calculated by ignoring compressibility to compensate for the reactive current effect. The third harmonic current is accommodated in the three-phase MHD generator in the same way as in three-phase conventional rotating generators and transformers.

Starting the regenerative build-up of current and flux density of the A-C MHD generators of this invention requires that there be some agency to provide the initial coil current or magnetic field as in a D-C MHD generator. Given sufficient gain in the MHD generator, electrical noise current in the coils will be sufficient to start the regenerative build up of current to the steady state value. If iron core coils are used, the residual flux can be used to provide the starting flux. If, as in the preferred embodiments, air core coils are used, an external direct or alternating current source may be momentarily connected across one or more coils to provide the starting field. An isolating impedance in series with such external source could avoid impending the natural regenerative action of the MHD generator. A D.C. battery 21, impedance 22 connected through switch 23 to coil 15 for starting purposes is shown in FIGURE 2.

MHD generators have been described which are applicable to electrical generating systems using ionized gases at temperatures characteristic of combustion processes or using liquid metal systems. These generators are seen to possess the desirable characteristics of generating A-C directly and of using only magnetic fields for energy storage.

While there have been shown and described the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A conduction type magnetohydrodynamic generator employing a flowing electrically conductive fluid to generate alternating current comprising, a duct for carrying said fluid, a plurality of electrode pairs, each pair spaced from each other pair along said duct, each electrode of a pair being opposite each other on an axis in said duct and adapted to allow fluid to pass between and in contact with the electrodes, magnetic coupling means for providing a magnetic field through each electrode pair transverse to said flow and axis, said field having components in-phase and 90° out-of-phase with the conduction current flowing between said electrode pair, each of said electrode pairs being conductively connected to said coupling means, said coupling means including means for inductively coupling said magnetic fields to each other to cause each field to assume a fixed phase relationship with respect to the other magnetic fields as determined by said coupling means, a plurality of loads, means for inductively connecting each load to a different magnetic field whereby a multiphase power output is obtained from said generator.

2. The apparatus as in claim 1 wherein said magnetic coupling means comprises self and mutual inductances wherein each conductive current of every electrode pair is magnetically coupled to every other electrode pair conductive current, and wherein said in-phase and 90° out-of-phase magnetic field components are substantially equal.

3. A conductive type magnetohydrodynamic generator employing a flowing electrically conductive fluid to generate alternating current comprising, a duct for conveying said fluid, a first and second pair of spaced electrodes in electrical contact with said fluid, said second pair of electrodes longitudinally disposed along said duct from said first pair of electrodes, a first and second plurality of electrically conducting coils, each plurality of coils when energized providing a magnetic field transverse to said fluid and a different pair of electrodes, a serial connection of one electrode pair and one coil of said first and second plurality of coils, to provide a conduction current through said electrode pair, a serial connection of the other electrode pair and the other coils of said first and second plurality of coils to provide a conduction current through said other electrode pair, one coil being connected in opposite polarity to the other coils, whereby the magnetic fields established by the coils are 90° out-of-phase with each other and have an in-phase and a 90° out-of-phase component with respect the said conduction currents in a particular field, means for coupling loads to said magnetic fields, whereby an alternating current is provided in one load which is 90° out-of-phase with the current in another load.

4. The apparatus as in claim 3 wherein the number of turns of all the coils are equal whereby maximum frequency of the alternating current is obtained.

5. A conduction type magnetohydrodynamic generator employing a flowing stream of electrically conductive fluid to generate an alternating current comprising, a duct for conveying said fluid, two electrode pairs, each pair spaced from each other pair along said duct, each electrode pair having an axis transverse to said fluid flow and allowing fluid to pass between and in contact with the electrodes of a pair, means for providing a different magnetic field passing through said fluid between the electrodes of each different pair, said means comprising a pair of coils for each field, one coil from each pair being serially connected to a different pair of electrodes, each serial coil when energized producing an MMF 90° out-of-phase with the MMF of the serially connected coils of the other pair, one coil having its MMF reversed to produce a magnetic field through one set of electrodes that is 90° out-of- phase with the field through the other set of electrodes, each of said serial connections including a load whereby a two-phase output is obtained.

6. The apparatus as in claim 5 wherein the magnitude of the MMF's producing a field through an electrode pair although 90° out-of-phase are equal in magnitude to provide maximum operating frequency.

7. A conduction type magnetohydrodynamic generator employing a flowing stream of electrically conductive fluid to generate alternating current comprising, a duct for conveying said fluid stream, three pairs of electrodes longitudinally disposed along said duct, each pair of electrodes in electrical contact with said fluid, the electrodes of any pair spaced opposite one another along an axis transverse to said fluid stream, means for providing three magnetic fields forming a balanced three phase system, each field being transverse to said fluid stream and said axis and passing between the electrodes of a different electrode pair, three electrical loads, each electrode pair serially connected with a load and three separate coils, each separate coil of said serial connection being coupled to a different field, whereby each field means comprises one coil from each serial connection, the polarity of one coil of each field means being opposite to the polarity of the other two coils of the same field means, whereby each of the loads has one phase current of a three phase balanced sequence of currents.

8. The apparatus of claim 7 wherein the coil connected to an electrode pair each of which are in the same magnetic field has $\sqrt{3/2}$ as many turns as each of the other coils in the same magnetic field, whereby maximum frequency of the output current is obtained.

9. A conduction type magnetohydrodynamic generator employing a flowing stream of electrically conductive fluid to generate alternating current comprising, a duct for conveying said fluid stream, three pairs of electrodes longitudinally disposed along said duct, each pair of electrodes in electrical contact with said fluid, the electrodes of any pair spaced opposite one another along an axis transverse to said fluid stream, three different coils connected serially with each electrode pair, one coil from each serial connection being oriented to produce a magnetic field for each electrode pair, each magnetic field being transverse to said fluid stream and said axis and passing between the electrodes of a different electrode pair, each serial connection having a current which is one phase of a three phase system, one coil for each magnetic field having its MMF reversed relative the other two coils of the same magnetic field, whereby the phase currents in the reversed MMF coil and one other coil produce an MMF which is 90° out of phase with the MMF produced by the remaining field coil, whereby a real and reactive field is provided for each phase current, said real and reactive fields through any electrode pair provides one phase of a three phase system, means for coupling to the magnetic field of each phase to provide a three-phase output.

10. The apparatus as in claim 9 wherein said MMF's are equal in magnitude for maximum frequency of the alternating current output.

11. A conduction type magnetohydrodynamic generator employing a flowing stream of electrically conductive fluid to generate alternating current comprising, a duct for conveying said fluid, a plurality of electrode pairs, each pair spaced from each other pair along said duct, each electrode pair being opposite each other along an axis in said duct and adapted to allow fluid to pass between and in contact with the electrodes of a pair, means for providing a plurality of magnetic fields, each field being transverse to said fluid flow and electrode pair axis and passing between the electrodes of one pair, a different plurality of coils for each field means, conductively connecting each electrode pair to a coil of the plurality of coils producing a field through said electrode pair to produce a magnetic field component in-phase with the current between said electrode pair through said fluid, conductively connecting at least one other different electrode pair to a different coil in the plurality producing the field through said electrode pair to produce a magnetic field component 90° out-of-phase with the current between said electrode pair through said fluid, whereby each electrode pair conduction current is subject to real and reactive magnetic fields, whereby said plurality of magnetic fields has a fixed phase relation relative to one another constituting a balanced phase system, means for coupling a load to said magnetic fields to provide a multi-phase current output to said load.

12. A conduction type magnetohydrodynamic generator employing a flowing stream of electrically conductive fluid to generate alternating current comprising, a duct for conveying said fluid stream, a plurality of electrodes in electrical contact with said fluid, a plurality of pairs of said electrodes longitudinally disposed along said duct, each pair having its electrodes spaced opposite one another along an axis transverse to said fluid stream, means for providing a plurality of magnetic fields transverse to said fluid stream and said electrode pair axis, each magnetic field passing between a different electrode pair, conductively connecting each electrode pair to said field providing means, each magnetic field comprising an in-phase and 90° out-of-phase flux component relative the current flowing between the electrodes through which said magnetic field passes, each magnetic field having a fixed phase relation with respect to the other magnetic fields, means for coupling a load to the plurality of magnetic fields, whereby an alternating current multi-phase load current is obtained.

13. A conductive type magnetohydrodynamic generator employing an electrically conductive flowing fluid to generate alternating current comprising, a duct for conveying said flowing fluid, a plurality of electrodes in electrical contact with said fluid, a plurality of pairs of said electrodes longitudinally disposed along said duct, each pair having electrodes spaced apart and opposite each other along an axis, a plurality of electrical loads, each electrode pair serially connected to a load and a plurality of coils, means for providing a plurality of magnetic fields forming a balanced n-phase system, whereby each magnetic field differs in phase from another magnetic field of the plurality by an integer multiple of $360°/n$, said integer being positive or negative, a different magnetic field transverse to said fluid and passing between the electrodes of each pair, each coil of said serial connection of a plurality of coils being in a different magnetic field of said plurality of magnetic fields, each electrode pair having one of its serially connected coils in a first magnetic field passing between the electrodes of said pair, one of the other serially connected coils being placed in a magnetic field whose phase is related to the first magnetic field by a positive integer, another of the serially connected coils being in a third magnetic field related to the first magnetic field by the negative of said integer, the polarity of the coil in either said second or third field being reversed to provide an induced current through said electrode pair serial circuit having an in-phase and 90° out-of-phase component with respect to the phase of the magnetic field passing through said electrode pair, means for coupling loads to said plurality of magnetic fields whereby a balanced n-phase electrical output is obtained.

No references cited.

DAVID X. SLINEY, *Primary Examiner.*